United States Patent
Li et al.

(10) Patent No.: US 11,558,548 B2
(45) Date of Patent: Jan. 17, 2023

(54) SYSTEMS AND METHODS FOR ENCODING REGIONS CONTAINING AN ELEMENT OF INTEREST IN A SEQUENCE OF IMAGES WITH A HIGH RESOLUTION

(71) Applicant: Ademco Inc., Golden Valley, MN (US)

(72) Inventors: Ting Li, Shanghai (CN); Xiaoxiang Lin, Shanghai (CN); Jun Wu, Shanghai (CN)

(73) Assignee: ADEMCO INC., Golden Valley, MN (US)

( * ) Notice: Subject to any disclaimer, the term of this patent is extended or adjusted under 35 U.S.C. 154(b) by 170 days.

(21) Appl. No.: 16/865,612

(22) Filed: May 4, 2020

(65) Prior Publication Data

US 2021/0344837 A1 Nov. 4, 2021

(51) Int. Cl.
*H04N 5/232* (2006.01)
*H04N 19/59* (2014.01)

(52) U.S. Cl.
CPC ......... *H04N 5/23232* (2013.01); *H04N 19/59* (2014.11)

(58) Field of Classification Search
CPC ............... H04N 5/23232; H04N 19/59; G06K 9/00711; G06K 9/38; G06K 9/3233
See application file for complete search history.

(56) References Cited

U.S. PATENT DOCUMENTS

| 6,393,152 B2 | 5/2002 | Takahashi |
| 8,564,661 B2 | 10/2013 | Lipton et al. |
| 8,917,765 B2 | 12/2014 | Liu et al. |
| 9,082,018 B1 | 7/2015 | Laska et al. |
| 9,215,467 B2 | 12/2015 | Cheok et al. |
| 9,325,951 B2 | 4/2016 | Saptharishi |

(Continued)

FOREIGN PATENT DOCUMENTS

| CN | 106485182 A | 3/2017 |
| EP | 1 953 699 A1 | 8/2008 |

(Continued)

OTHER PUBLICATIONS

Lirong, Wu et al. "A Foreground-background Parallel Compression with Residual Encoding for Surveillance Video", Arxiv.org, Cornell University Library, 201 Olin Library Cornell University Ithaca, NY 14853, Jan. 18, 2020 (Jan. 18, 2020), 12 pgs.

(Continued)

*Primary Examiner* — Sinh Tran
*Assistant Examiner* — Zhenzhen Wu
(74) *Attorney, Agent, or Firm* — Fredrikson & Byron, P.A.

(57) ABSTRACT

Systems and methods for encoding regions containing an element of interest in a sequence of images with a high resolution are provided. Such systems and methods can include a camera that can capture the sequence of images of a monitored region, a detection processor that can identify a first region that contains an element of interest within the sequence of images, and an encoder that can encode the first region within a first subset of the sequence of images with a first resolution and encode a second region within the first subset of the sequence of images outside of the first region with a second resolution that is less than the first resolution, wherein a number of the sequence of images in the first subset of the sequence of images is less than all of the sequence of images and is based on a predefined parameter.

20 Claims, 4 Drawing Sheets

(56) References Cited

U.S. PATENT DOCUMENTS

| | | |
|---|---|---|
| 9,769,368 B1 | 9/2017 | Morford et al. |
| 2002/0080878 A1 | 6/2002 | Li |
| 2002/0159637 A1* | 10/2002 | Echigo ............... G06T 7/20 |
| | | 707/E17.121 |
| 2010/0119156 A1* | 5/2010 | Noguchi ............ H04N 19/132 |
| | | 382/190 |
| 2010/0119157 A1* | 5/2010 | Kameyama ........ H04N 19/587 |
| | | 382/243 |
| 2010/0124274 A1* | 5/2010 | Cheok ............... H04N 19/142 |
| | | 375/240.03 |
| 2012/0020407 A1* | 1/2012 | Liu .................. H04N 19/127 |
| | | 375/240.01 |
| 2013/0121588 A1* | 5/2013 | Noguchi ............. H04N 19/59 |
| | | 382/195 |
| 2014/0198838 A1* | 7/2014 | Andrysco ............ H04N 19/12 |
| | | 375/240.1 |
| 2015/0047024 A1 | 2/2015 | Park |
| 2015/0145944 A1 | 5/2015 | Stonefield et al. |
| 2015/0215583 A1 | 7/2015 | Chang |
| 2015/0364158 A1 | 12/2015 | Gupte et al. |
| 2017/0078694 A1* | 3/2017 | Kusano ............... H04N 19/59 |
| 2018/0349708 A1 | 12/2018 | van Hoof et al. |
| 2019/0208160 A1 | 7/2019 | Jose et al. |

FOREIGN PATENT DOCUMENTS

| | | |
|---|---|---|
| EP | 2863638 A1 | 4/2015 |
| WO | WO 2014/117048 A1 | 7/2014 |

OTHER PUBLICATIONS

Anonymous: "5 Ways to Extract Video Frames and Save to Images"—Raymond.cc, Dec. 11, 2019 (Dec. 11, 2019), Retrieved from the Internet: URL:https://web.archive.org/web/20191211081159/https://www.raymond.cc/blog/extract-video-frames-to-images-using-vic-media-player/ retrieved on Jun. 28, 2021, 10 pgs.

International Search Report and Written Opinion of the ISA/EP in PCT/US2021/027277, dated Jul. 9, 2021, 15 pgs.

English language translation of bibliographic data and abstract of CN 106485182 (A).

Hata et al., Surveillance System with Mega-Pixel Scalable Transcoder, Mitsubishi Electric Research Laboratories, Jan. 2007.

Unifore Security. Overview and Close-Up: 20 Megapixel (3472 X 3648) IP Camera, Jul. 30, 2015, http://www.uniforenet/ip-video-surveillance/overview-and-close-up-20-megapixel-5472-x-3648-ip-camera.html.

* cited by examiner

SYSTEMS AND METHODS FOR ENCODING REGIONS CONTAINING AN ELEMENT OF INTEREST IN A SEQUENCE OF IMAGES WITH A HIGH RESOLUTION

FIELD

The present invention relates generally to video monitoring systems. More particularly, the present invention relates to systems and methods for encoding regions containing an element of interest in a sequence of images with a high resolution.

BACKGROUND

Known video monitoring systems can encode regions that contain an element of interest in a sequence of images with a higher resolution than regions that do not contain the element of interest. However, known systems encode the element of interest with the higher resolution in every one of the sequence of images in which the element of interest appears even though not every one of the sequence of images may contain additional relevant information about the element of interest. Accordingly, known systems may encode more of the sequence of images with the higher resolution than is necessary, which can result in large and unnecessary storage costs.

In view of the above, there is a need and an opportunity for improved systems and methods.

DETAILED DESCRIPTION

Figure 1:
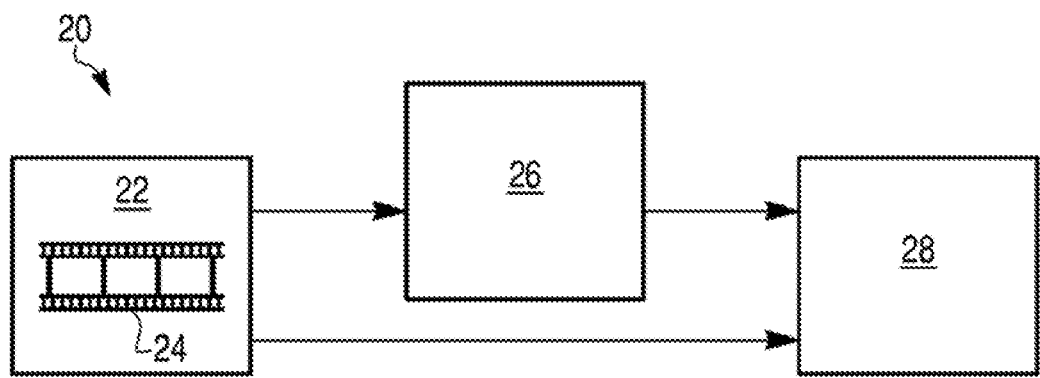
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments of the claimed invention can include a video monitoring system encoding an element of interest in a sequence of images of a monitored region with a high resolution. In some embodiments, the video monitoring system can include a camera, a detection processor, and an encoder, and in some embodiments, the camera, the detection processor, and the encoder can be integrated into a single device, such as a doorbell device. Alternatively, in some embodiments, at least one of the detection processor and the encoder can be housed in or on a cloud server that is remote from the monitored region, and/or at least one of the camera, the detection processor, and the encoder can be housed in or on a control panel located inside of or proximate to the monitored region.

In some embodiments, the camera can capture the sequence of images of the monitored region and transmit the sequence of images to the detection processor. The detection processor can receive the sequence of images from the camera and identify a first region that contains a first element of interest within the sequence of images, and the encoder can receive the sequence of images from either the camera or the detection processor and receive an indication of the first region from the detection processor. Then, the encoder can encode the first region within a first subset of the sequence of images with a first resolution and can encode a second region outside of the first region within the first subset of the sequence of images with a second resolution that is less than the first resolution. In some embodiments, the first resolution can be a maximum resolution of the encoder, and the second resolution can be a minimum resolution of the encoder. Additionally or alternatively, in some embodiments, one or both of the first resolution and the second resolution can be determined based on user input received by the video monitoring system.

In some embodiments the encoder can encode any or all of the sequence of images in a single file with multiple resolutions using the H.265 standard, and in some embodiments, after encoding any or all of the sequence of images, the encoder can output the sequence of images to one or more of a plurality of destination devices, including but not limited to a remote user device associated with the monitored region, a local storage device associated with the monitored region, a remote storage device associated with the cloud server, a central monitoring station, etc.

In some embodiments, a number of the sequence of images in the first subset of the sequence of images can be less than all of the sequence of images, and in some embodiments, the number of the sequence of images in the first subset of the sequence of images can be based on a predefined parameter. Various embodiments for the predefined parameter are contemplated, including a time value and an image number value. For example, in embodiments in which the predefined parameter includes the time value, the first subset of the sequence of images can include any of the sequence of images captured by the camera during a time window beginning at a first time when the detection processor identifies the first region or the first element of interest and ending at a second time equal to the first time plus the time value. Additionally or alternatively, in embodiments in which the predefined parameter includes the time value, the first subset of the sequence of images can include periodic images in the sequence of images captured by the camera at a periodic time that is equal to the time value. However, in embodiments in which the predefined parameter includes the image number value, the first subset of the sequence of images can include a sequential number of the sequence of images captured by the camera beginning with a first of the sequence of images captured in which the detector processor identifies the first region or the first element of interest, wherein the sequential number is equal to the image number value. Additionally or alternatively, in embodiments in which the predefined parameter includes the image number value, the first subset of the sequence of images can include periodic images in the sequence of images captured by the camera at a period that is equal to the image number value.

In some embodiments, the encoder can encode a second subset of the sequences of images differently than the first subset of the sequence of images. For example, in some embodiments the encoder can encode all regions within the second subset of the sequence of images with the second resolution. Alternatively, in some embodiments, the encoder can encode the first region within the second subset of the sequence of images with a third resolution and can encode the second region within the second subset of the sequence of images with the second resolution. In these embodiments, the third resolution can be less than the first resolution and more than the second resolution.

In some embodiments, the second subset of the sequence of images can include all of the sequence of images outside of the first subset of the sequence of mages. However, in some embodiments, a number of the sequence of images in the second subset of the sequence of images can be less than all of the sequence of images, and in some embodiments, the number of the sequence of images in the second subset of the sequence of images can be determined based on the predefined parameter.

In some embodiments the detection processor and/or the encoder can identify a third region within the first subset of the sequence of images or the second subset of the sequence of images, and the encoder can encode the third region within the first subset of the sequence of images or the second set of the sequence of images with the third resolution. In these embodiments, the third region within the first subset of the sequence of images or the second subset of the sequence of images can contain a second element of interest, and the second element of interest can be a different, less important type than the first element of interest. For example, in some embodiments, the first element of interest can include a face of a first person in the monitored region, and the second region can include a body of the first person and/or immediate surroundings of the first person. Additionally or alternatively, in some embodiments, the first element of interest can include a first moving object in the monitored region, and the second element of interest can include immediate surroundings of the first moving object.

However, in some embodiments, the encoder can encode the third region within the first subset of the sequence of images or the second subset of the sequence of images with the first resolution. In these embodiments, the third region within the first subset of the sequence of images or the second subset of the sequence of images can contain the second element of interest, but the second element of interest can be a new element of interest that is a same type as the first element of interest. For example, in some embodiments, the second element of interest can include a face of a second person in the monitored region or a second moving object in the monitored region.

In some embodiments, the encoder and/or the detection processor can identify the third region from the indication of the first region and at least one relational parameter. For example, in some embodiments, the at least one relational parameter can include a scaling parameter that can define a size of the third region in relation to a size of the first region. Additionally or alternatively, in some embodiments, the at least one relational parameter can include an offset parameter that can define a position of the third region relative to a position of the first region. For example, in embodiments in which the first element of interest includes the face of the first person, the at least one relational parameter can include an average position of a generic body relative to a generic face.

FIG. 1 is a block diagram of video monitoring system 20 according to disclosed embodiments. As seen in FIG. 1, in some embodiments, the video monitoring system 20 can include a camera 22 that can capture a sequence of images 24, a detection processor 26 that can receive the sequence of images 24 from the camera 22, and an encoder 28 that can receive the sequence of images 24 from the camera 22 or the detection processor 26 and can receive an indication of one or more regions with the sequence of images from the detection processor 26.

Figure 2:
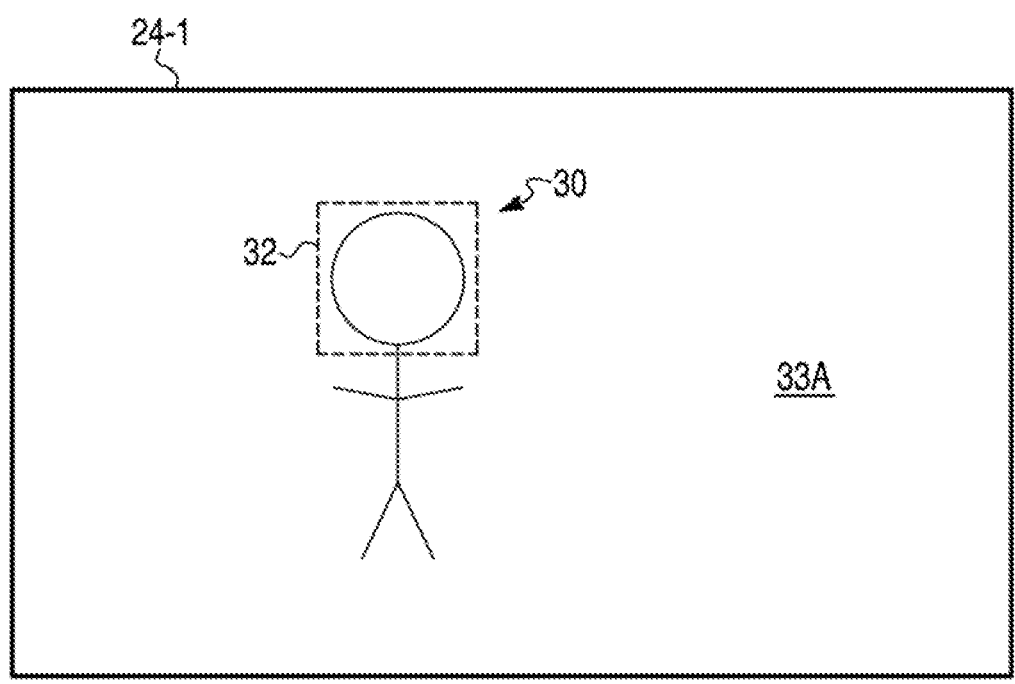
FIG. 2 is a block diagram of one of a sequence of images as processed by a detection processor in accordance with disclosed embodiments.
Figure 3:
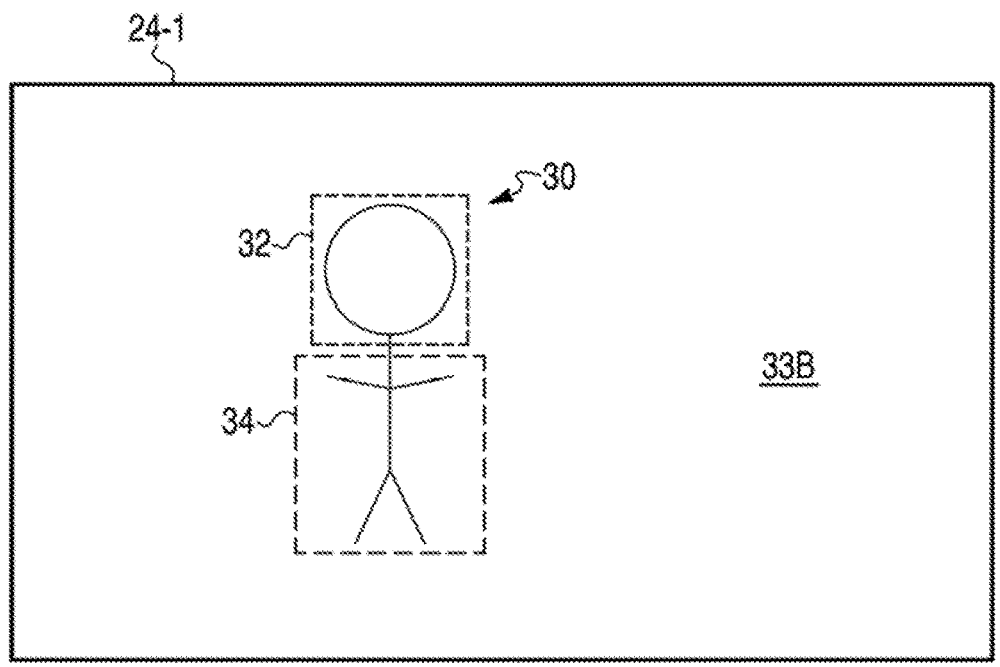
FIG. 3 is a block diagram of one of a sequence of images as processed by a detection processor in accordance with disclosed embodiments.

FIG. 2 and FIG. 3 are block diagrams of a first image 24-1 of the sequence of images 24 as processed by the detection processor 26 in accordance with disclosed embodiments. As seen in FIG. 2, the first image 24-1 can include a first element of interest 30, for example, a face of a first person. Accordingly, the detection processor 26 can identify a region 32 that contains the first element of interest 30 within the first image 24-1 and a region 33A outside of the region 32 within the first image 24-1. As seen in FIG. 3, in some embodiments, the detection processor 26 can also identify a region 34 within the first image 24-1 such that the region 34 is associated with another feature of the first person, for example, a body of the first person. In these embodiments, the detection processor 26 can identify a region 33B outside of both the region 32 and the region 34 within the first image 24-1.

Figure 4:
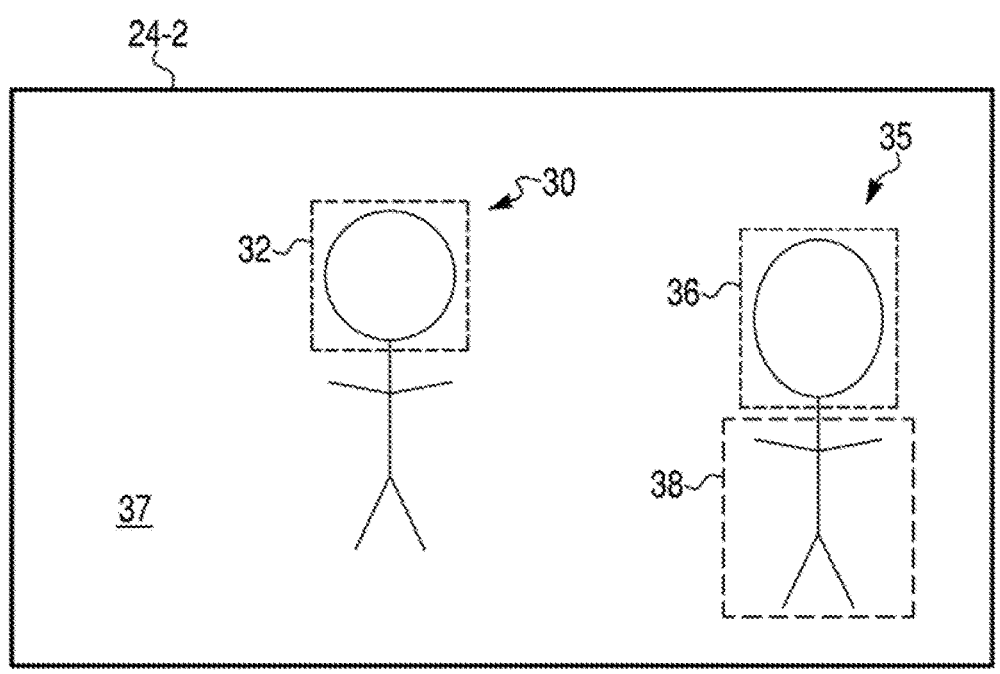
FIG. 4 is a block diagram of one of a sequence of images as processed by a detection processor in accordance with disclosed embodiments

FIG. 4 is a block diagram of a second image 24-2 of the sequence of images 24 as processed by the detection processor 26 in accordance with disclosed embodiments. The second image 24-2 can be captured after the first image 24-1 and, as seen, can include the first element of interest 30 and a second element of interest 35, for example, a face of a second person. Accordingly, the detection processor 26 can identify the region 32 that contains the first element of interest 30 within the second image 24-2, a region 36 that contains the second element of interest 35 within the second image 24-2, and a region 37 outside of both the region 32 and the region 36 within the second image 24-2. In some embodiments, the detection processor can also identify a region 38 that is analogous to the region 34, but is associated with the region 36 rather than the region 32 (e.g. a body of the second person). In these embodiments, the detection processor 26 can identify the region 37 as being outside of all of the region 32, the region 36, and the region 38 (and the region 34, if identified) within the second image 24-2.

In operation, the detection processor 26 can transmit the indication of the region 32, the region 33A, the region 33B, the region 34, the region 36, and/or the region 37 to the encoder 28. Then, the encoder 28 can encode one or more of the region 32, the region 33A, the region 33B the region 34, the region 36, and/or the region 37 in the first image 24-1 and/or the second image 24-2 at resolutions that can be determined from a value of a predefined parameter and whether the first element of interest 30 and/or the second element of interest 35 are newly identified elements of interest or previously identified elements of interest as described in more detail below. However, in some embodiments, the detection processor 26 need not identify and transmit the indication of the region 33A, the region 33B, and/or the region 37, and in these embodiments, the encoder 28 can directly identify the region 33A, the region 33B, and/or the region 37, where necessary, from the indication of the region 32, the third region 34, and/or the region 36.

Figure 5:
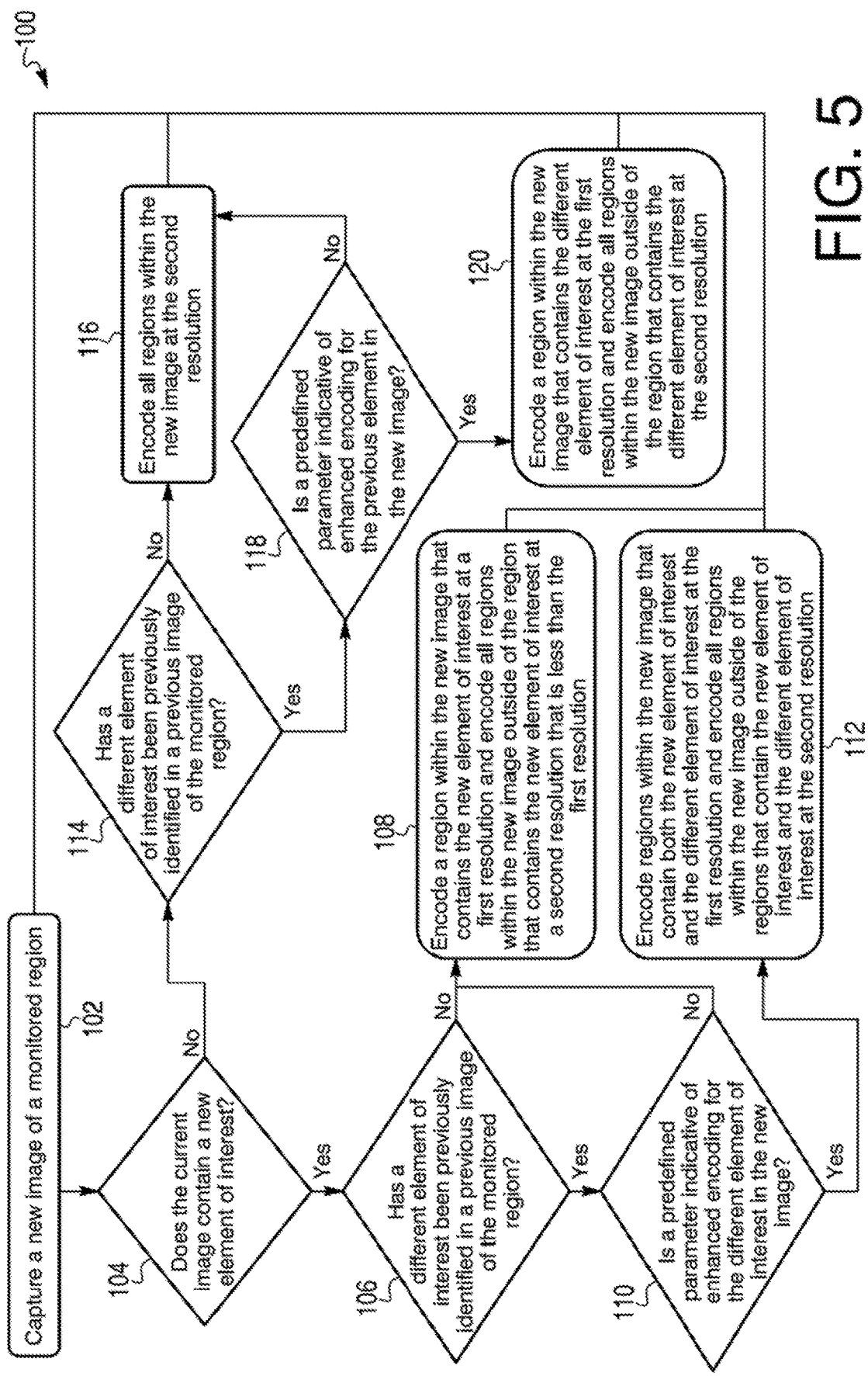
FIG. 5 is a flow diagram of a method in accordance with disclosed embodiments.

FIG. 5 is flow diagram of a method 100 in accordance with disclosed embodiments. The method 100 can include the camera 22 capturing a new image of a monitored region (e.g. the first image 24-1 of the sequence of images 24, as in FIG. 2, or the second image 24-2 of the sequence of images, as in FIG. 4), as in 102. Then, the method 100 can include determining whether the new image contains a new element of interest (e.g. the first element of interest 30 or the second element of interest 35), as in 104.

When the new image contains the new element of interest, the method 100 can include determining whether a different element of interest has been previously identified in a previous image of the monitored region, as in 106. When the different element of interest has not been previously identified, the method 100 can include the encoder 28 encoding a region within the new image that contains the new element of interest at a first resolution and encoding all regions within the new image outside of the region that contains the new element of interest at a second resolution that is less than the first resolution, as in 108. For example, when the first element of interest 30 is first identified in the first image 24-1 of FIG. 2, the method 100 can include the encoder 28 encoding the region 32 in the first image 24-1 with the first resolution and encoding the region 33A in the first image 24-1 with the second resolution.

However, when the different element of interest has been previously identified, the method 100 can include determining whether a predefined parameter, such as, for example a time value and an image number value, is indicative of enhanced encoding for the different element of interest in the new image, as in 110. If so, then the method 100 can include the encoder 28 encoding regions within the new image that contain both the new element of interest and the different element of interest at the first resolution and encoding all regions within the new image outside of the regions that contain the new element of interest and the different element of interest at the second resolution, as in 112. For example, when the second image 24-2 is captured after the first image 24-1 and the predefined parameter indicates the enhanced encoding of the region 32 within the second image 24-2, the method 100 can include the encoder 28 encoding the region 32 and the region 36 within the second image 24-2 with the first resolution and encoding the region 37 within the second image 24-2 with the second resolution.

However, when the predefined parameter is not indicative of the enhanced encoding for the different element of interest in the new image, the method 100 can include the encoder 28 encoding only the region within the new image that contains the new element of interest at the first resolution and encoding all regions within the new image outside of the region that contains the new element of interest at the second resolution, as in 108. For example, when the second image 24-2 is captured after the first image 24-1, but the predefined parameter does not indicate the enhanced encoding of the region 32 within the second image 24-2, the method 100 can include the encoder 28 encoding the region 36 within the second image 24-2 with the first resolution and encoding the region 32 and the region 37 within the second image 24-2 with the second resolution. However, in some embodiments, when the predefined parameter does not indicate the enhanced encoding of the region 32 within the second image 24-2, the method 100 can include the encoder 28 encoding the region 32 within the second image 24-2 with a third resolution that is less than the first resolution and greater than the second resolution.

When the new image fails to contain a new element of interest, the method 100 can include determining whether the different element of interest has been previously identified in the previous image, as in 114. When the different element of interest has not been previously identified, the method 100 can include the encoder 28 encoding all regions within the new image at the second resolution, as in 116.

However, when the different element of interest has been previously identified, the method 100 can include determining whether the predefined parameter is indicative of the enhanced encoding for the different element of interest in the new image, as in 118. If not, then the method 100 can include the encoder 28 encoding all regions within the new image at the second resolution, as in 116.

However, when the predefined parameter is indicative of the enhanced encoding for the different element of interest in the new image, the method 100 can include the encoder 28 encoding a region within the new image that contains the different element of interest at the first resolution and encoding all regions within the new image outside of the region that contains the different element of interest at the second resolution, as in 120. For example, when the first element of interest 30 was previously identified in a previous image captured before the first image 24-1 and the predefined parameter indicates the enhanced encoding for the first element of interest 30 in the first image 24-1, the method 100 can include the encoder 28 encoding the region 32 within the first image 24-1 with the first resolution and encoding the region 33A within the first image 24-1 with the second resolution.

Figure 6:
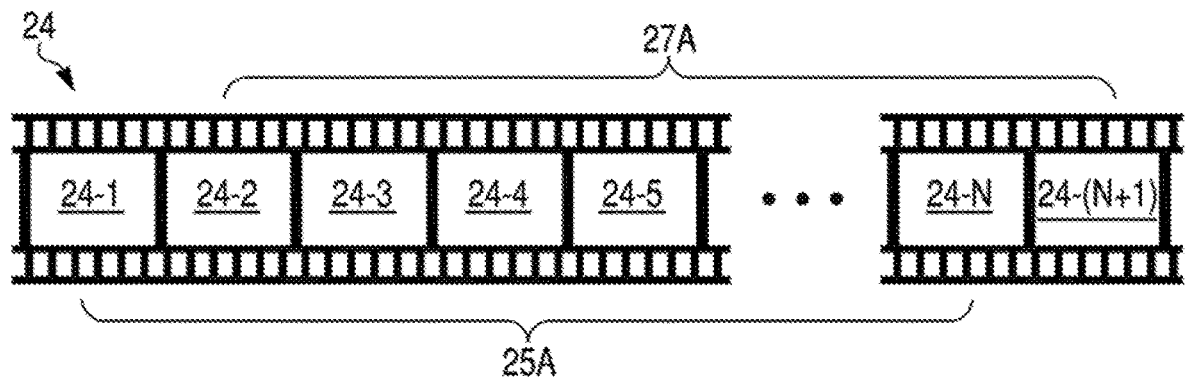
FIG. 6 is a block diagram of a sequence of images in accordance with disclosed embodiments.
Figure 7:
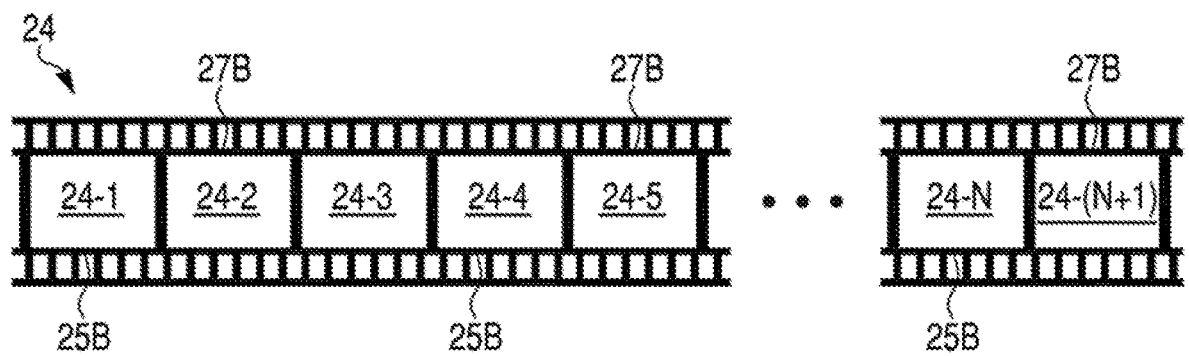
FIG. 7 is a block diagram of a sequence of images in accordance with disclosed embodiments.

FIG. 6 and FIG. 7 are block diagrams of the sequence of images 24 according to disclosed embodiments. As seen in FIG. 6 and FIG. 7, in some embodiments, the sequence of images 24 can include a finite or an infinite grouping of images from the first image 24-1 to a last image 24-(N+1) of the sequence of images 24. When each of the sequence of images 24 is processed as in FIG. 5, the encoder can encode regions in a first subset 25A, 25B of the sequence of images 24 and/or a second subset 27A, 27B of the sequence of images 24 as indicated by a predefined parameter, such as, for example, a time value and an image number value.

For example, as seen in FIG. 6, the time value or the image number value can define a consecutive time window or a sequential number of the sequence of images. In these embodiments, the consecutive time window can begin at a first time when an object or a region for encoding is captured or identified and ending at a second time equal to the first time plus the time value. Similarly, the sequential number of the sequence of images 24 can begin when the object or the region for encoding is captured or identified, wherein the sequential number is equal to the image number value. Alternatively, as seen in FIG. 7, the time value or the image number value can define periodic images in the sequence of images 24. In these embodiments, a periodic time can be equal to the time value or the image number value, and the periodic images in the sequence of images 24 captured at the periodic time can be encoded (e.g., every third one of the sequence of images 24).

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be What claimed is:

1. A system comprising:
a camera that captures a sequence of images of a monitored region;
a detection processor that identifies a first region that contains a first element of interest within the sequence of images and a second region that contains a second element of interest within the sequence of images, the first element of interest including a moving object and the second element of interest including an area adjacent the moving object, wherein the detection processor is configured to determine whether each of the first element of interest and the second element of interest is a newly identified element of interest or a previously identified element of interest; and
an encoder that encodes the first region within a first subset of the sequence of images with a first resolution, and encodes the second region within the first subset of the sequence of images outside of the first region with a second resolution that is less than the first resolution when the detection processor determine that the second element of interest is a previously identified element of interest and encodes the second region within the first subset of the sequence of images outside of the first region with a third resolution that is less than the first resolution and more than the second resolution when the detection processor determine that the second element of interest is a newly identified element of interest,
wherein a number of the sequence of images in the first subset of the sequence of images is less than all of the sequence of images and is based on a predefined parameter.

2. The system of claim 1 wherein the predefined parameter includes a time value, and wherein the first subset of the sequence of images includes any of the sequence of images captured during a time window beginning at a first time when the first region is identified and ending at a second time equal to the first time plus the time value.

3. The system of claim 1 wherein the predefined parameter includes a time value, and wherein the first subset of the sequence of images includes periodic images in the sequence of images captured at a periodic time equal to the time value.

4. The system of claim 1 wherein the predefined parameter includes an image number value, and wherein the first subset of the sequence of images includes a sequential number of the sequence of images equal to the image number value and beginning when the first region is identified.

5. The system of claim 1 wherein the predefined parameter includes an image number value, and wherein the first subset of the sequence of images includes periodic images in the sequence of images captured at a period equal to the image number value.

6. The system of claim 1 wherein the detection processor identifies a third region that contains a third element of interest within the sequence of images, and wherein the encoder encodes the third region within the first subset of the sequence of images with a fourth resolution that is less than the first resolution and more than the second resolution.

7. The system of claim 1 wherein the encoder encodes a third region within the first subset of the sequence of images with a fourth resolution that is less than the first resolution and more than the second resolution, and wherein the third region is predefined relative to the first region by at least one relational parameter.

8. The system of claim 1 wherein, when the detection processor identifies a third region that contains a new element of interest within the sequence of images, the encoder encodes the third region within a second subset of the sequence of images with the first resolution, and wherein a number of the sequence of images in the second subset of the sequence of images is less than all of the sequence of images and is based on the predefined parameter.

9. The system of claim 1 wherein the encoder encodes all regions within a second subset of the sequence of images with the second resolution, and wherein the second subset of the sequence of images includes all of the sequence of images outside of the first subset of the sequence of images.

10. The system of claim 1 wherein the encoder encodes the first region within a second subset of the sequence of images with a fourth resolution and encodes the second region within the second subset of the sequence of images with the second resolution, wherein the second subset of the sequence of images includes all of the sequence of images outside of the first subset of the sequence of images, and wherein the fourth resolution is less than the first resolution and more than the second resolution.

11. A method comprising:
capturing a sequence of images of a monitored region;
identifying a first region that contains a first element of interest within the sequence of images and a second region that contains a second element of interest within the sequence of images, the first element of interest including a moving object and the second element of interest including an area adjacent the moving object;
determining whether each of the first element of interest and the second element of interest is a newly identified element of interest or a previously identified element of interest; and
encoding the first region within a first subset of the sequence of images with a first resolution, and encoding the second region within the first subset of the sequence of images outside of the first region with second resolution that is less than the first resolution when it is determined that the second element of interest is a previously identified element of interest and encoding the second region within the first subset of the sequence of images outside of the first region with a third resolution that is less than the first resolution and more than the second resolution when it is determined that the second element of interest is a newly identified element of interest,
wherein a number of the sequence of images in the first subset of the sequence of images is less than all of the sequence of images and is based on a predefined parameter.

12. The method of claim 11 wherein the predefined parameter includes a time value, and wherein the first subset of the sequence of images includes any of the sequence of images captured during a time window beginning at a first time when the first region is identified and ending at a second time equal to the first time plus the time value.

13. The method of claim 11 wherein the predefined parameter includes a time value, and wherein the first subset of the sequence of images includes periodic images in the sequence of images captured at a periodic time equal to the time value.

14. The method of claim 11 wherein the predefined parameter includes an image number value, and wherein the first subset of the sequence of images includes a sequential number of the sequence of images equal to the image number value and beginning when the first region is identified.

15. The method of claim 11 wherein the predefined parameter includes an image number value, and wherein the first subset of the sequence of images includes periodic images in the sequence of images captured at a period equal to the image number value.

16. The method of claim 11 further comprising:
identifying a third region that contains a third element of interest within the sequence of images; and
encoding the third region within the first subset of the sequence of images with a fourth resolution that is less than the first resolution and more than the second resolution.

17. The method of claim 11 further comprising:
encoding a third region within the first subset of the sequence of images with a fourth resolution that is less than the first resolution and more than the second resolution,
wherein the third region is predefined relative to the first region by at least one relational parameter.

18. The method of claim 11 further comprising:
responsive identifying a third region that contains a new element of interest within the sequence of images, encoding the third region within a second subset of the sequence of images with the first resolution,
wherein a number of the sequence of images in the second subset of the sequence of images is less than all of the sequence of images and is based on the predefined parameter.

19. The method of claim 11 further comprising:
encoding all regions within a second subset of the sequence of images with the second resolution,
wherein the second subset of the sequence of images includes all of the sequence of images outside the first subset of the sequence of images.

20. The method of claim 11 further comprising:
encoding the first region within a second subset of the sequence of images with a fourth resolution; and
encoding the second region within the second subset of the sequence of images with the second resolution,
wherein the second subset of the sequence of images includes all of the sequence of images outside of the first subset of the sequence of images, and
wherein the fourth resolution is less than the first resolution and more than the second resolution.

* * * * *